United States Patent [19]
Campbell

[11] 3,921,842
[45] Nov. 25, 1975

[54] MOTORCYCLE CARRIER ATTACHMENT FOR WHEELED VEHICLE

[76] Inventor: Floyd R. Campbell, 3736 Salina, Wichita, Kans. 67204

[22] Filed: Nov. 22, 1974

[21] Appl. No.: 526,179

[52] U.S. Cl. ............... 214/450; 214/334; 214/505
[51] Int. Cl.² .......................................... B60R 9/10
[58] Field of Search ............. 214/450, 451, 505, 85, 214/85.1, 454, 77 R, 506, 501, 330–334; 224/42.03 B, 42.03 R; 280/106 T, 150.5

[56] References Cited
UNITED STATES PATENTS

| | | | |
|---|---|---|---|
| 3,586,188 | 6/1971 | Campbell | 214/450 |
| 3,720,333 | 3/1973 | Vaughn | 214/450 |
| 3,720,336 | 3/1973 | Murray et al. | 214/505 |
| 3,822,798 | 7/1974 | Neff | 214/85 |

*Primary Examiner*—Robert J. Spar
*Assistant Examiner*—Jerold M. Forsberg
*Attorney, Agent, or Firm*—Robert E. Breidenthal

[57] ABSTRACT

A cycle carrier attachment for vehicles which includes an elongated platform adapted to support a cycle thereon between upstanding blocking structures at the opposite ends of the platform. The platform is pivotally mounted intermediate its ends on a base and the blocking structures are pivoted on the base with links interconnecting the blocking structures and the base in such a manner that the blocking structure on the end of the platform that is lowered being caused to move to a position such as to serve as a loading ramp.

17 Claims, 14 Drawing Figures

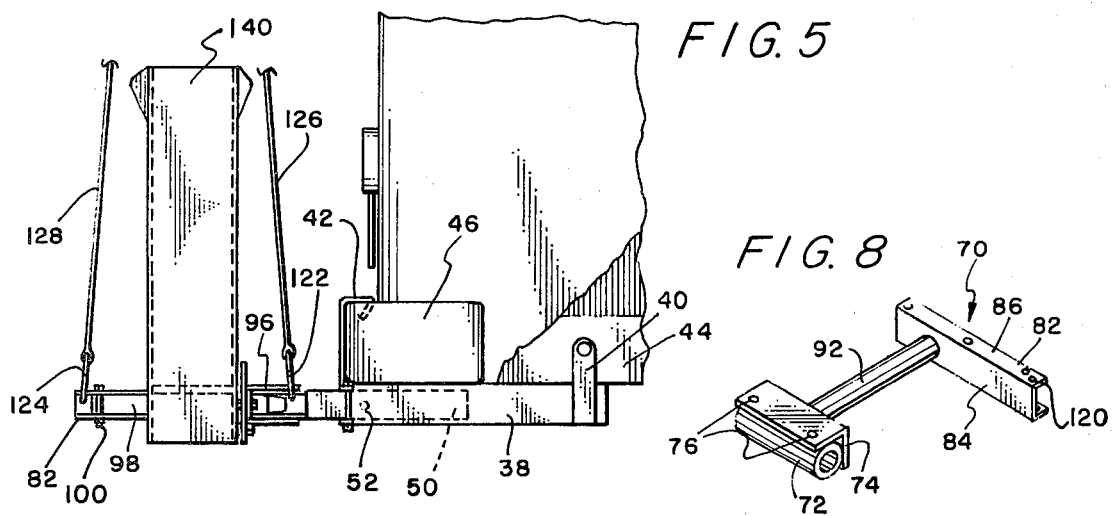
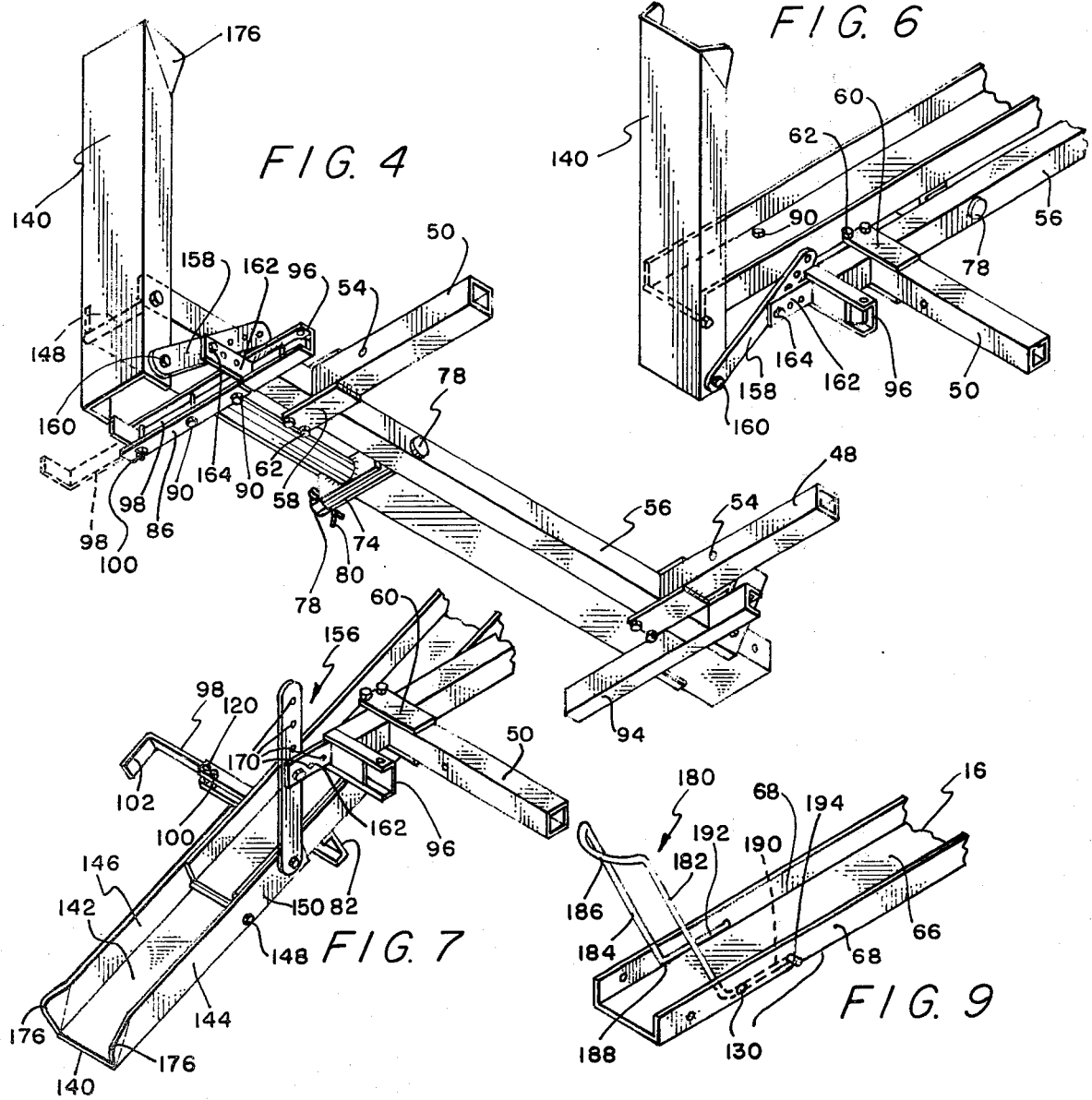

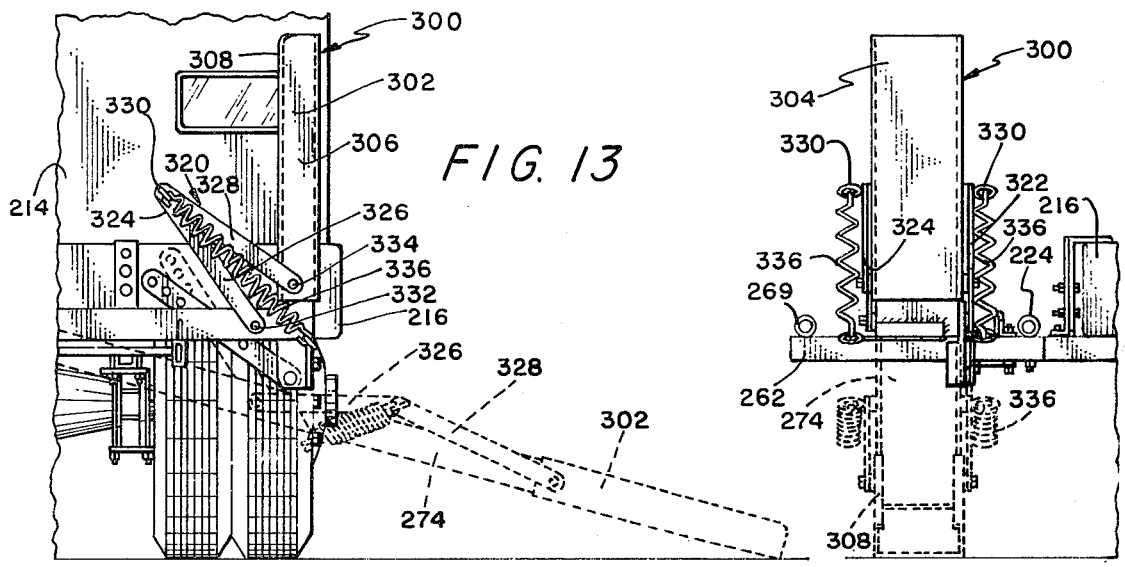
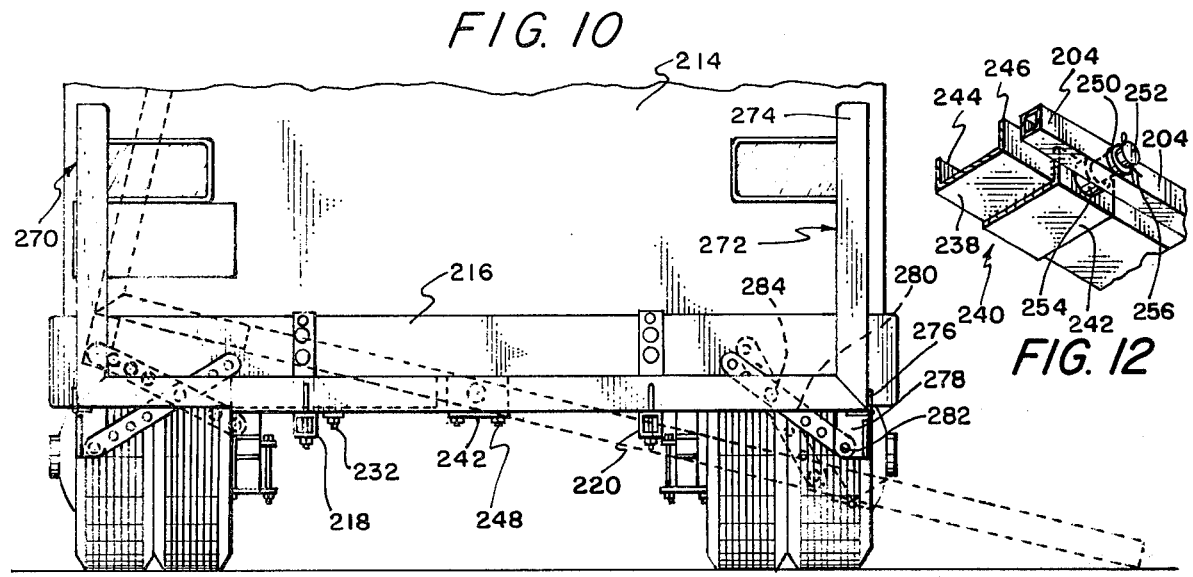
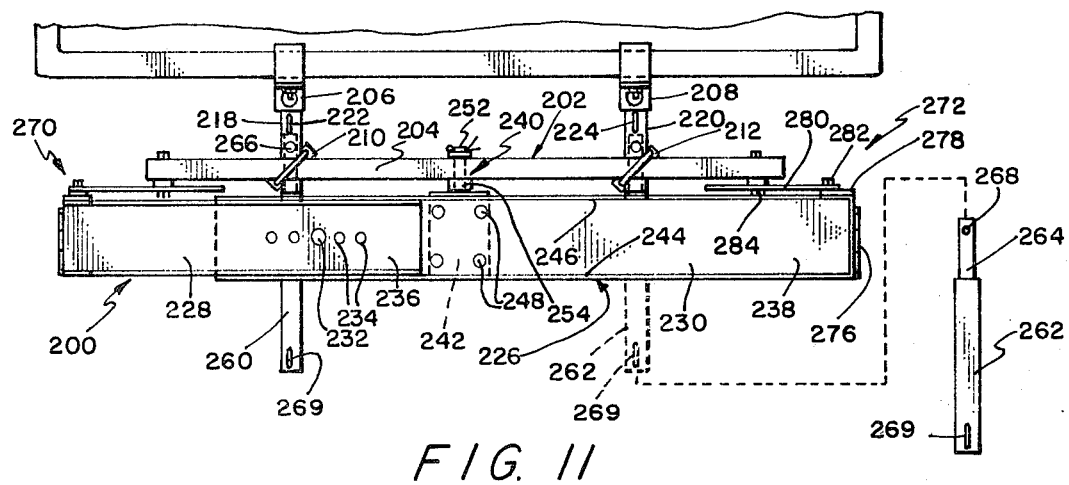

MOTORCYCLE CARRIER ATTACHMENT FOR WHEELED VEHICLE

The present invention relates to new and useful improvements in attachments for vehicles by means of which various forms of cycles can be transported, and more particularly pertains to attachments of such character that are tiltable to an inclined position to facilitate the loading and unloading by realization of the mechanical advantage of the use of an inclined plane.

The following listed U.S. patents will afford a background understanding of the art:

| | | |
|---|---|---|
| 3,348,713 | Will | Oct. 24, 1967 |
| 3,586,188 | Cambell | June 22, 1971 |
| 3,695,469 | Arant | Oct. 3, 1972 |
| 3,458,073 | Dawson | July 29, 1969 |

An important object of the present invention is to provide a durable, inexpensive and reliable cycle transport that can be readily attached to conventional self propelled vehicles, and which when so attached is not unattractive and which can be readily and easily loaded to carry a cycle in an unobtrusive manner.

Another important object of the present invention is to provide an attachment in accordance with the preceding object which will maximize convenience and economy in materials and weight by the provision of a single multifunction element that will serve: (a) as a loading ramp; (b) as a guide during loading; (c) as a blocking member to prevent endwise movement of a loaded cycle; and (d) as a restraining member to restrain a loaded cycle against lateral upset or tilting.

Broadly, the invention involves a cycle carrier attachment for vehicles comprising a base adapted to be mounted on a vehicle, an elongated cycle supported platform pivotally mounted on the base for tilting movement about a horizontal tilting axis that is transverse to its longitudinal extent, the arrangement being such that the support platform can be tilted from a horizontal transport position to a tilted loading position with such tilting being accompanied by one end of the platform being lowered relative to the base, means for releasably securing the platform in its transport position, an elongated blocking and ramp means pivotally mounted on said one end of the platform for swinging movement relative to the longitudinal extent of the platform about a horizontal and transverse axis between an upstanding blocking position and a downwardly inclined ramp position, and means interconnecting the base and the combined means for actuating pivotal movement of the latter in response to pivotal movement of the platform relative to the base, the arrangement being such that the combined means is in its blocking and ramp positions when the platform is, respectively, in its transport and loading positions.

The invention will be best understood in the light of the following description of preferred embodiments of the same, such description being given in conjunction with the accompanying drawings, wherein:

FIG. 4 is an isometric view of the attachment in transport position, dashed lines illustrating hidden parts and the unlocking position of the latch bar;

FIG. 5 is an end view of the attachment in transport position, hidden parts being shown in dashed outline, with only fragmentary portions of the tie downs and the vehicle being shown;

FIG. 6 is an isometric and fragmentary showing of the attachment, and especially illustrates the means for articulating the combined blocking and ramp means, with certain hidden parts being shown in dashed outline;

FIG. 7 shows the same structure as FIG. 6, but shows the combined means in its ramp or loading position in contrast to the blocking position shown thereof in FIG. 6;

FIG. 8 is an enlarged isometric view of the bearing and torsion bar means of the tiltable cycle support platform;

FIG. 9 illustrates a modification of attachment shown in FIGS. 1–8 having to do with a selectively positionable blocking member for use in lieu of the fixed blocking member that opposes the blocking position of the combined blocking and ramp means;

FIG. 10 is a rear end view of another embodiment of the attachment that has articulated combined blocking and ramp means at each end of the platform, the same being shown in full lines mounted on a partially shown vehicle, and the same being shown in one of its two loading positions in dashed outline;

FIG. 11 is a top plan view of the embodiment shown in FIG. 10, however, one latch bar is shown removed in full lines, and in its latching position in dashed lines, such illustrated positions being connected by a dashed line;

FIG. 12 is a fragmentary isometric illustration of the pivotal mounting means for the platform of the embodiment shown in FIGS. 10 and 11;

FIG. 13 is a fragmentary rear end view of yet another embodiment of the attachment and shows the combined means as being extensible when in the ramp position shown in dashed outline; and FIG. 14 is an end view of the structure shown in FIG. 13, the extended ramp position being shown in dashed outline.

Figure 1:
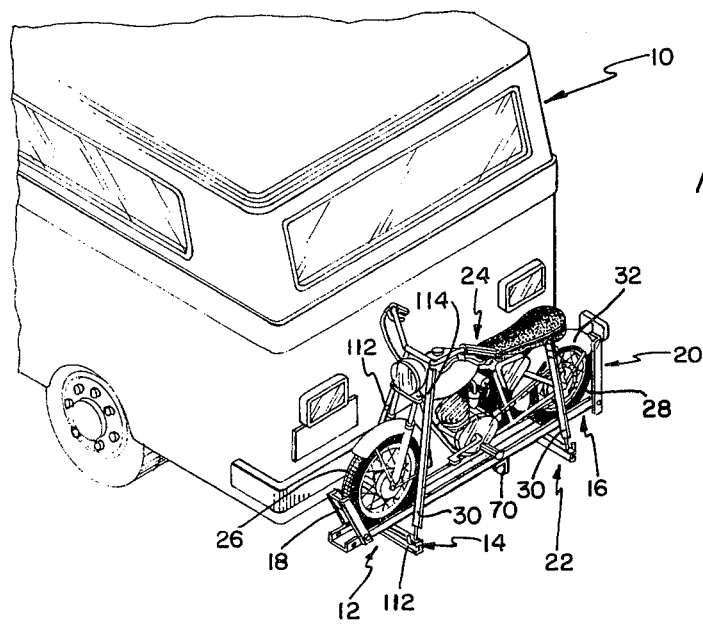
FIG. 1 is an isometric view of the attachment showing the same attached to the rear end of a fragmentarily shown vehicle and showing the same supporting a cycle in transport position.

Referring now to the drawings wherein like numerals designate like parts throughout the various views and giving initial attention to the embodiment of the invention shown in FIGS. 1–9, the reference numeral 10 designates generally a self propelled automotive vehicle, the same only being partially shown as it does not in and of itself constitute the subject matter of the instant invention. The character of or specific form of the vehicle is of no basic importance and the same can be of the van or trucklike type shown in the drawings, or any conventional passenger automobile, it only being necessary that the attachment of this invention can be attached so that the latter can be loaded and unloaded as will be described.

The attachment is designated generally at 12 adapted to be secured to or mounted on the vehicle 10; an elongated platform 16 pivotally mounted on the platform; an upstanding blocking member 18 fixed to one end of the platform 16; a combined blocking and ramp means 20 pivotally mounted on the other end of the platform 16; and a latch means 22 for releasably securing the platform 16 in its horizontal transport position shown thereof in FIG. 1.

The attachment 12 in the transport position shown in FIG. 1 carries a cycle designated generally at 24, the same having the bottoms of its front and rear wheels 26 and 28 resting on and received within the narrow confines of the transverse U-shape or channel configuration of the platform 16, while forward and rear portions of such wheels, respectively, abut the blocking member 18 and the combined means 20 while the tie down means 30 additionally stabilize and releasably secure the cycle 24 in its transport position.

The cycle 24 can, as will be readily recognized, be of any conventional cycle type vehicle such as vehicles known as bicycles, motor cycles, motor scooters, etc.; the central feature of such vehicles to which the present invention is well suited is the mounting of two wheels in tandem. The blocking member 18 and the combined means 20 do not necessarily engage forward and rear portions of the cycle wheels 26 and 28 directly in order to prevent endwise movement of the cycle 24, and can serve such function by engaging fenders of such wheels, luggage racks, or other cycle structure such as retractable support prop stands (not shown), it being noted that the rear wheel fender 32 of the cycle 12 engages the combined means 20.

Figure 3:
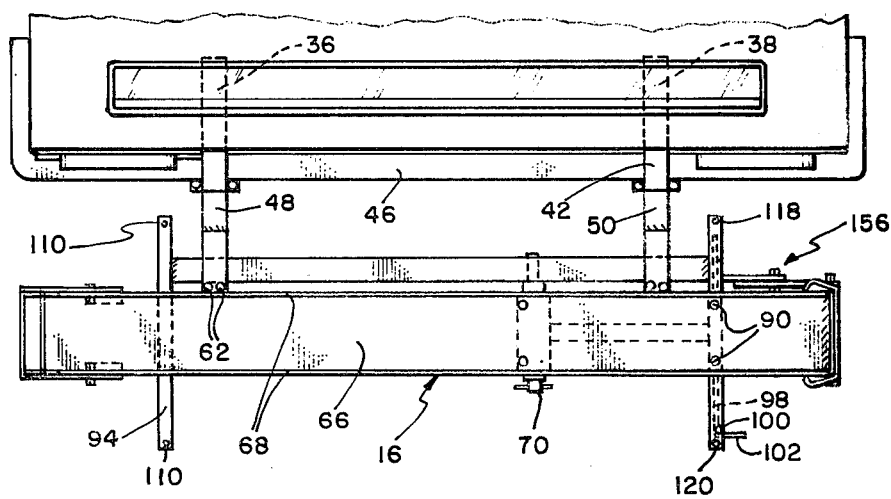
FIG. 3 is a plan view of the structure shown in FIG. 2, with hidden parts being shown in dashed outline.

Proceeding now to a more detailed description of the attachment 12, the base 14 comprises a pair of elongated tubular mounting brackets 36 and 38 that are fixedly secured in spaced parallel relationship to the lower rear end portion of the vehicle 10. As shown in FIGS. 3 and 5, the brackets are attached at 40 and 42 to the vehicle frame 44 and the bumper 46 to present their rear ends facing rearwardly at positions adjacent the lower edge of the bumper. The tubular brackets 36 and 38 telescopingly receive the forward ends of extension elements 48 and 50, respectively, and such elements are releasably secured in their operative positions by bolts 52 that extend through aligned openings 54 in the brackets 36 and 38 and their extension elements 48 and 50. Removal of the bolts 52 enables the detachment of the attachment 12 (excepting the mounting brackets 36 and 38) from the vehicle 10 when desired.

The attachment frame or base 14 includes an elongated cross beam 56 that is carried by the elements 48 and 50. Inasmuch as the spacing of the elements 48 and 50 will often vary from one vehicle to the next, the connections of the elements 48 and 50 conveniently accommodate such variation. The forward end of each of the elements 48 and 50 is defined by a pair of vertically spaced plates 58 and 60 that can with tight tolerance accept the cross beam 56 therebetween so that the center of the cross beam 56 can be adjusted endwise relative to elements 48 and 50 so as to center the same between the latter. Bolts 62 extend through the forward ends of the plates 58 and 60 and the latter clamp and securely grip the cross beam 56 on tightening of the bolts 62.

The platform 16 comprises an elongated piece of channel iron that has a web 66 and upstanding flanges 68. Means is provided for pivotally mounting the platform 16 that in addition to such primary function serves (a) to strengthen the platform 16 against twisting about its longitudinal axis to such an extent that lighter weight material can be used, and (b) to serve as a portion of the latch means 22. Such multifunction means is designated at 70 and details thereof are best shown in FIGS. 4 and 8. The means 70 comprises a tubular bearing or bushing 72 brazed or otherwise rigidly secured within a short angle member 74 that is bolted or riveted to the underside of the platform web 66 through openings 76 in the angle 74. A pivot pin 78 extends through and is welded to the cross beam 56 to extend rearwardly therefrom and through the bearing 72 with a cotter pin 80 securing the bearing 72 and the pin 78 in assembled relation.

The multifunction means 70 includes a shallow channel member 82 that includes a web 84 and flanges 86 and 88. The member 82 is secured to the underside of the platform 16 by bolts 90 that extend through both flanges 86 and 88 in spaced relation to the web 84 for a reason subsequently to be explained. A tubular torsion bar 92 extends between and has its opposite ends welded to the angle 74 and the web 84 of the channel or latch bar guide 82. The hereinbefore mentioned strengthening function of the means 70 is realized by the provision of the reinforcing or torsion bar 92.

Figure 2:
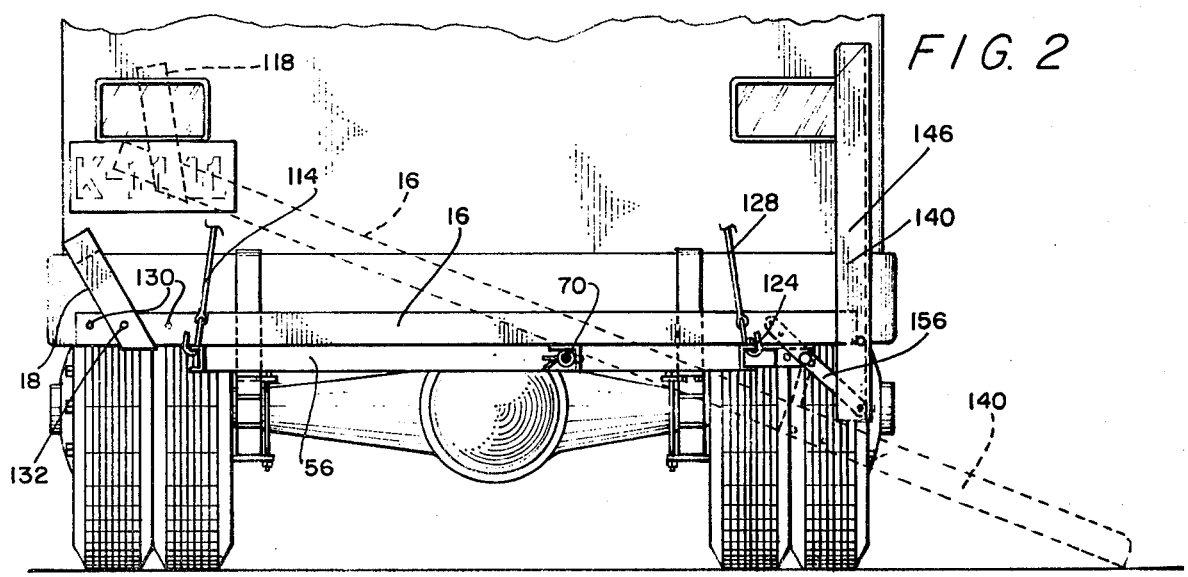
FIG. 2 is an enlarged rear end view of the attachment shown in FIG. 1, the cycle being omitted, and with the attachment being shown in loading position in dashed outline.

The base 12 includes a stop or rest 94 in the form of a channel welded to one end of the cross beam 56 to project rearwardly into the travel path of the platform 16 so as to support the platform 16 and prevent counterclockwise pivotal movement of the same as viewed in FIGS. 1 and 2 when in its horizontal transport position.

A latchkeeper 96 in the form of a channel member is welded to the end of the cross beam opposite the stop 14. The latchkeeper has the same cross section as the previously described channel and the parts are so arranged that such channels 82 and 96 are in alignment when the platform 16 is in transport position and in engagement with the rest 94.

Such channels 82 and 96 together with a latch bar 98 constitute the previously mentioned latch means 22. The latch bar 98 slides and guides within the channel 82 intermediate the web 84 and the bolts 90 and serves on being thrust into the channel 96 when the platform 16 is in its transport position to latch the latter in such position. An additional bolt 100 extends through the latch guide 82 to aid the bolts 90 in their guiding function and to serve as a stop for limiting the movement of the latch bar 98 by engagement of an offset tab or lateral extension 102 at one end of the latter.

The tie down means 30 comprises the rest 94 having openings 110 at its opposite ends which as FIG. 3 clearly shows are on opposite sides of the platform 16. Conventional elongated elements 112 and 114 are disposed on opposite sides of the cycle 24 and have upper ends detachably secured in any suitable manner to the cycle 24, and have their lower ends detachably anchored to the rest 94 by hooks 116 passed through the openings 110. The elements 112 and 114 can be of elastic character so as to securely hold the cycle down on the platform 16 and also afford a convenient means for releasing the elements 112 and 114 from both the cycle 24 and the rest 94.

The latch guide 82 and the latchkeeper 96 have openings 118 and 120 that afford anchoring positions for the hooks 122 and 124 at the lower ends of elastic tie downs 126 and 128 that are generally similar to the tie downs 112 and 114. It is to be noted that the hook 124 when anchored to the latch guide 82 as shown in FIGS. 1 and 5 blocks unlatching movement of the latch bar 98. In this since the hook 124 can be considered a lock and if desired or deemed expedient the hook 124 can be the U-shaped securing section of a conventional padlock as a deterent to theft of the cycle 24. Locking the latch bar 98 against unlatching movement will necessitate, as will be seen, any would-be thief to lift the cycle 24 out of the confines of the platform 16, and the weight of many cycles would make this a very difficult task as well as the irregular unloading procedure alerting any observer to the likelihood of criminal activity.

The blocking member is of an inverted U-shape configuration and is secured to the platform 16 at any one of a plurality of selected positions defined by openings 130 in the flanges 68 of the platform 16 by bolts 132. The blocking member 18 not only limits forward movement of the cycle but accepts the forward extremity of the cycle 24 therein so that the blocking member 18 restrains the forward end of the cycle 24 against falling over sidewise. As will be seen presently the combined means 20, when in its blocking position, serves both such functions too.

The combined blocking and ramp means 20 comprises an elongated channel member 140 comprised of a web 142 and flanges 144 and 146. The member 140 is, at a position spaced intermediate its ends, pivotally secured to one end of the platform by a pivot pin or bolt 148 that passes through suitable openings in the flanges 68 and the flanges 144 and 146, the latter pair of flanges slidingly receiving the former therebetween.

The member 140 can be swung between a blocking position shown in FIG. 2 that is nearly vertical to the platform 16 to a ramp position shown in FIG. 7 wherein it is essentially an extension of the platform 16 and is limited to such ramp position by engagement of the relative short portion 150 of the member 140 at one side of the pivot 148 with the underside of the platform 16.

Means 156 is provided for actuating movement of the member 140 between its blocking and ramp position in response to tilting movement of the platform 16 from its transport position and loading positions (respectively shown in full and dashed lines in FIG. 2), and vice versa. The means 156 comprises a link 158 having one end pivoted at 160 to the flange 144 of the member. The link 158 is also pivoted to a bar 162 by a pivot bolt 164. The bar 162 is welded to the latchkeeper 96 in spaced relation to the web portion of the latter so as to not interfere with movement of the latch bar 98 thereinto, and both the link 158 and the bar 162 have a plurality of openings 170 therein to afford selectivity as to the position of the pivot bolt 164. The adjustability thereby afforded accommodates various positions of the platform 16 or degrees of tilt of the platform 16 at which the member 140 becomes aligned therewith. This amounts to a height adjustment and can be such that the member 140 contacts the road surface line (or a curb level for any given height of the pivot 70 above the road surface. The adjustment is easily made by removal of the bolt 164 and then positioning the platform 16 and the member 140 in any desired ramp position, moving the link to align a pair of openings 170 and then securing the bolt 164 through such aligned openings 170. Should more than one choice of aligned openings 170 be possible, the choice is entirely optional unless one pair offers a preferable angular relationship of the platform 16 and the member 140 when the platform is in its transport position.

It is believed that the manner in which the actuating means 156 effects its function will be evident on perusing FIGS. 2, 4, 6 and 7.

The flanges 144 and 146 also serve to guide a cycle 24 as the latter is rolled along the member 140 when the latter is in its ramp position. Such guiding function of the flanges 144 and 146 is further enhanced by the flaring 176 thereof at the free end of the member 140.

The use of the attachment 12 is believed self evident. Suffice to say that to load a cycle 24, the platform 16 is unlatched and placed in its loading position, this positioning being accompanied by the combined means 20 being actuated to move the member 140 to its ramp position. The cycle 24 is then simply rolled up the inclined plane defined by the aligned platform 16 and member 140 until the blocking member 18 prevents further movement of the cycle 24, and the platform 16 is then tilted to its horizontal transport position; such tilting movement being eased by the weight distribution of the cycle 24 at such time relative to the pivot 70. Such tilting is accompanied by the member 140 from its ramp to its blocking position, it being noted that the cycle 24 does not rest on the member 140 when the cycle has moved sufficiently to engage the blocking member 18. After the tilting to the horizontal has been completed the latch bar 98 is moved to its latching position and the tie downs applied to hold the cycle down and also to lock the latch bar 98 against inadvertent displacement.

Unloading of the cycle 24 is effected by reversing the loading steps outlined in the preceding paragraph.

Attention is now directed to the minor modification of the static blocking member shown in FIG. 9. In lieu of the blocking member 18 that is bolted to the flanges 68 of the platform 16 through the holes 130, a blocking member 180 is provided that is made of appropriately bent steel rod of resilient character. The member 180 is formed to define a pair of legs 182 and 184 joined by an arcuate bight portion. The legs 182 and 184 are bent at obtuse angles 188 to define parallel outer leg portions 190 and 192 that terminate in oppositely extending tip portions 194 that are biased to extend outwardly through a selected pair of the openings 130. Selection of the pair of openings is made on the basis of the length of the cycle 24 as will be understood. To change the selection, the legs 182 and 184 are simply squeezed together to release the tip portions from the previously selected pair of openings and then releasing the legs 182 and 184 while extending the tip portions 194 through the newly selected pair of holes. The member 180 affords the convenience of not requiring any tools to make a cycle length adjustment. It will be noted that the spacing of the legs 182 and 184 will accommodate a portion of the front wheel 26 therebetween, and that the leg portions 190 and 192 seat at the junctures of the flanges 68 with the web 66 to afford substantial resilient stability.

Attention is now directed to the embodiment of the invention shown in FIGS. 10–12 designated generally at 200, which in contrast to the previously described attachment 12 that tilts only one direction for loading, enables selective tilting in either direction for loading.

As in the previously described structure, there is provided a base 202 comprised of a cross beam 204 that is carried by vehicle attaching means 206 and 208 by means of U-bolt clamps 210 and 212 that afford adjustable positioning of the cross beam 202. The attaching means 206 and 208, as in the previously described embodiment, can be of conventional character except as specifically described and are such as to accommodate secure attachment to the rear end of a vehicle 214 by clamping the bumper 216 and being secured to the frame of the vehicle by any suitable means, not shown.

The mounting means 206 and 208 include rearwardly extending horizontal tubular members 218 and 220 that have eye defining elements 222 and 224 fixed thereon forwardly of the positions at which the cross beam 204 is clamped thereon. The elements 222 and 224 afford anchoring positions for tie down means, not shown.

A platform 226 is provided that is generally similar to the previously described platform 16, and differs therefrom primarily by being formed of nested channel members 228 and 230 rather than of a single channel. The nested channels 228 and 230 enable adjustability in the longitudinal extent of the platform 226, and such channels are secured together at selected overall platform length by a bolt 232 that extends through one of the openings 234 in the web 236 of the inner channel 228 that is aligned with an opening (not shown) in the web 238 of the lower and outer channel 230, as will be readily perceived.

Means 240, best shown in FIG. 12, is provided for pivotally securing the platform 226 to the cross beam about an axis that is spaced above the web 238 of the channel 230. The channel 230 is locally reinforced in the vicinity of such pivotal connection by an L-shaped member 242 fitted about the exterior of the web 238 and one of the upstanding flanges 244 and 246 that define the channel 230. The member 242 is secured to the web 238 by bolts 248.

A bearing or tubular bushing 250 extends through the center of the cross beam 204 and a pivot pin 252 integrally secured to the member 240 extends through a spacer or washer 254 and the bearing 250, with a cotter pin 256 preventing inadvertent separation of the parts.

A pair of removable rests or stops 260 and 262 are provided for selectively preventing tilting of the platform from the horizontal transport position shown thereof in full lines in FIG. 10. Such stop members 260 and 262 have reduced forward end portions 264 that are slidingly received in the tubular members 218 and 220, and when so received are directly below and are engaged by the platform 226 on opposite sides of the pivot means 240.

The stop members are releasably retained in their stop positions by means of bolts 266 that extend through aligned openings 268 in the tubular members 218 and 220 and the stop members 260 and 262. The bolts 266 can be parts of padlocks if desired so that would-be thieves cannot tilt the platform 226 from its transport position.

If it is desired to tilt the platform counterclockwise as viewed in FIG. 10, the stop 260 is released and removed. On the other hand, clockwise tilting is permitted on release and removal of the stop member 262.

Eye elements 269 are fixed to the stop members 260 and 262 to serve in conjunction with the elements 222 and 224 as anchors for tie downs, not shown.

Combined blocking and ramp means 270 and 272 are provided at the opposite ends of the platform 226. Inasmuch as such means are essentially mirror images of each other, a detailed description of only one of said means is necessary.

The combined blocking and ramp means 272 comprises a channel 274 hingedly connected to the end of Channel 230 by a hinge means 276. A strap 278 is welded to one side of the channel 274 so as to extend opposite the axis of the hinge means 276 from the longitudinal extent of channel 274.

Means is provided to actuate pivotal movement of the channel member 274 from its blocking position relative to the platform 226 to its ramp position shown in dashed outline in repose to the platform 226 being moved clockwise, as viewed in FIG. 10, to the loading position shown in dashed outline. Such means is similar to that of the previously described embodiment, and comprises a link 280 having spaced pivotal connections 282 and 284 to the strap 278 and the cross beam 204. The link 280 has a plurality of openings 286 affording a selection for the spacing of the pivotal connections whereby the tilt of the platform 226 corresponding to alignment of the channel 274 therewith can be varied as will be easily understood from the previous description of the attachment 12.

The geometry of the system is such, as can be appreciated on study of FIG. 10, that whereas the clockwise movement from the transport position will cause the combined means 272 to move the channel 274 from its blocking to its ramp position, the combined means 270 will remain relatively unchanged in its relationship to the platform 226. The converse is also true for reasons of symmetry when the platform is tilted anticlockwise so that the combined means 270 performs its ramp function.

The use of the attachment 200 requires no description in view of the previously explained use of the attachment 12.

Attention is now directed to the modification shown in FIGS. 13 and 14, such modification comprising the attachment 200 augmented to provide extensions for the combined means 270 and 272 when they are in their ramp positions. Since such augmentations are identical to each other, it will suffice to describe in detail the augmentation of the combined means 272, and indeed FIGS. 13 and 14 illustrate solely such augmentation of the combined means 272.

The combined means 272 as augmented is designated generally at 300 and comprises in addition to the previously described components of the combined means 272 an extension element 302 slidingly mounted on the member 274. The extension element 302 includes a web 304 extending between flanges 306. The free edges 308 of the flanges 306 are inturned to overlie the edges of the channel so to present lateral separation of the extension element 302 from the channel 274. The extension element 302 constitutes a sliding telescopic extension of the channel 274 that is approximately coterminous with the latter when retracted, and which nearly doubles to overall length of the assembly when extended as shown in dashed outline in FIG. 13.

Means 320 is provided for limiting the extension of the element and for actuating the extension element 302 to assume its retracted and extended positions in response to the channel 274 being moved respectively to its blocking and ramp positions. Such means comprises forward and rear toggle linkages 322 and 324 each comprising links 326 and 328 pivotally connected by eye bolts 330. The links 326 and 328 have their remote ends pivotally connected to side flanges of the platform 226 and the extension element 302 at positions 332 and 334 near the ends of such members adjacent the hinge 276. Coiled tension springs 336 extend between the eye bolts 330 and eyes 338 formed at the opposite ends of the hinge pin of the hinge 276.

The toggle linkages 322 and 324 limit the extension of the extension element as shown in FIG. 13 in dashed outline, and inspection of FIG. 13 reveals the geometry and spatial relationship of the parts to be such that the springs urge retraction when the channel 274 is in its blocking position shown in full lines, and tend to urge extension when the channel 274 is in its ramp position. It will be evident that as the channel 274 is swung intermediate its blocking and ramp positions in response to tilting of the platform 226, the extension element 302 will automatically be actuated by the means 320 to move between the positions shown thereof in FIGS. 13 and 14.

The augmented combined means 300 is of value when it is desired that the slope or tilt of the platform 226 be minimized for loading and unloading. Reduction of tilt requires less force to move the cycle. Obviously, the extension element 302 will make ground contact to serve as a ramp on a considerably reduced tilt of the platform 226.

Attention is now directed to the appended claims.

I claim:

1. A cycle carrier attachment for vehicles comprising a base adapted to be mounted on a vehicle, means mounting the base at one end of the vehicle, an elongated cycle support platform pivotally mounted on the base for tilting movement about a horizontal tilting axis that is transverse to its longitudinal extent, the arrangement being such that the support platform can be tilted from a horizontal transport position to a tilted loading position with such tilting being accompanied by one end of the platform being lowered relative to the base, means for releasably securing the platform in its transport position, an upstanding blocking member is secured to the other end of the platform, an elongated combined blocking and ramp means pivotally mounted on said one end of the platform for swinging movement relative to the longitudinal extent of the platform about a horizontal and transverse axis between an upstanding blocking position and a downwardly inclined ramp position, and means interconnecting the base and the combined means for actuating pivotal movement of the latter in response to pivotal movement of the platform relative to the base, the arrangement being such that the combined means is in its blocking and ramp positions when the platform is, respectively, in its transport and loading positions, whereby the combined means serve as a guide for the wheels of a cycle when serving as a ramp during loading operations and whereby the same is adapted to receive a cycle wheel and to retain the same against lateral dislodgement when serving to block the same against longitudinal movement.

2. The combination of claim 1, wherein said combined means includes telescoping means for extending the length of the same together with means operative to extend and retract the length of the combined means when the combined means is, respectively, in its ramp and blocking positions.

3. The combination of claim 1, wherein the combined means includes telescoping means for extending the length of the same.

4. The combination of claim 3, wherein the telescoping means comprises an element slidably mounted for movement toward and away from the pivotal mounting of the combined means on the platform, and toggle link means connecting said element to the platform together with spring means for yieldingly urging said element respectively toward and away from such pivotal mounting of the combined means on the platform when the combined means is in its blocking and ramp positions.

5. The combination of claim 1, wherein the tilting axis is intermediate the ends of the support platform, the arrangement being such that the support platform can be tilted to a second loading position with such tilting being accompanied by the other end of the platform being lowered relative to the base, said blocking member is a second elongated combined blocking and ramp means pivotally mounted on said other end of the platform for swinging movement relative to the longitudinal extent of the platform about a horizontal and transverse axis between an upstanding blocking position and a downwardly inclined ramp position, and means interconnecting the base and the second combined means for actuating pivotal movement of the latter in response to pivotal movement of the platform relative to the base, the arrangement being such that the second combined means is in its blocking and ramp positions when the platform is, respectively, in its transport and second loading positions, whereby the platform can be selectively loaded and unloaded in the first mentioned and the second loading positions thereof.

6. The combination of claim 5, wherein one of said combined means includes telescoping means for extending the length of the same.

7. The combination of claim 6, including means operative to extend and retract the length of said one combined means when said one combined means is respectively in its ramp and blocking positions.

8. The combination of claim 1, wherein said means for releasably securing the platform in its transport position comprises relatively movable coacting elements fixed to the base and the platform, and means selectively engageable with said elements when the platform is in its transport position for preventing relative movement of said elements.

9. The combination of claim 1, wherein said means for releasably securing the platform in its transport position is a latch means comprising a latch guide and a latchkeeper carried by the base and the platform in an arrangement such that the guide and the latchkeeper are in operative relationship to each other solely when the platform is in its transport position, and an elongated latch member slidingly guided by the latch guide for engagement with the latchkeeper when the platform is in its transport position.

10. The combination of claim 9, together with means for selectively preventing disengagement of the latch member and the latchkeeper.

11. The combination of claim 10, wherein the last recited means comprises a portion of the means for releasably securing a cycle on the attachment.

12. The combination of claim 1, wherein said platform including telescoping means intermediate the combined means and said blocking member, whereby the spacing between the combined means and the blocking member can be adjusted, and means for securing the telescoping means to retain an adjusted spacing.

13. The combination of claim 1, including means for selectively securing the blocking member in an upright position to the platform at any one of a plurality of positions spaced differing distances opposite the tilting axis from the combined means.

14. The combination of claim 1, wherein the combined means is transversely of a U-shaped configuration.

15. The combination of claim 1, wherein said base includes a latchkeeper, said means for releasably securing the platform in its transport position comprising a latch guide fixed to the platform and latch member slidingly carried by the latch guide, said latch member being engageable with the latchkeeper when the platform is in its transport position.

16. The combination of claim 1, wherein said vehicle attachment means on said base includes a pair of frame members provided with means for attachment to a vehicle, with said means for releasably securing the platform comprising a stop member telescopingly and slidingly engaging one of said frame members and being selectively positionable in the travel path of the platform.

17. The combination of claim 1, wherein the interconnecting means is a link having pivotal connections to the base and to the combined means.

\* \* \* \* \*